(12) United States Patent
Porat et al.

(10) Patent No.: US 9,896,280 B2
(45) Date of Patent: Feb. 20, 2018

(54) STACKED TILT TRAY AND CROSS-BELT SORTING SYSTEM

(71) Applicant: GB Instruments Inc., Deerfield Beach, FL (US)

(72) Inventors: Joseph Porat, Highland Beach, FL (US); Israel Schechter, Aventura, FL (US)

(73) Assignee: GB Instruments Inc., Deerfield Beach, FL (US)

( * ) Notice: Subject to any disclaimer, the term of this patent is extended or adjusted under 35 U.S.C. 154(b) by 0 days.

(21) Appl. No.: 15/620,527

(22) Filed: Jun. 12, 2017

(65) Prior Publication Data

US 2017/0275105 A1    Sep. 28, 2017

Related U.S. Application Data

(63) Continuation of application No. 15/080,693, filed on Mar. 25, 2016, now Pat. No. 9,676,566.

(60) Provisional application No. 62/138,384, filed on Mar. 25, 2015.

(51) Int. Cl.
| | |
|---|---|
| *B65G 47/96* | (2006.01) |
| *B07C 1/00* | (2006.01) |
| *B07C 3/02* | (2006.01) |
| *B07C 5/36* | (2006.01) |

(52) U.S. Cl.
CPC .............. *B65G 47/962* (2013.01); *B07C 1/00* (2013.01); *B07C 3/02* (2013.01); *B07C 5/36* (2013.01); *B65G 2207/46* (2013.01)

(58) Field of Classification Search
CPC .. B65G 17/345; B65G 47/945; B65G 47/962; B65G 47/965; B65G 2207/46; B07C 1/00; B07C 3/02; B07C 5/36
USPC ....................................... 198/370.04, 370.06
See application file for complete search history.

(56) References Cited

U.S. PATENT DOCUMENTS

| | | | | |
|---|---|---|---|---|
| 3,463,298 | A | * | 8/1969 | Harrison .............. B65G 47/965 198/370.04 |
| 5,307,921 | A | * | 5/1994 | Richardson ............. B07C 3/082 198/370.04 |
| 5,575,375 | A | * | 11/1996 | Sandusky .............. B65G 1/133 198/358 |

(Continued)

*Primary Examiner* — Leslie A Nicholson III
*Assistant Examiner* — Keith R Campbell
(74) *Attorney, Agent, or Firm* — Glenn E. Gold, P.A.; Glenn E. Gold; David Colls (57) ABSTRACT

A multi-level product sortation system includes sortation apparatuses interconnected on a conveyor and a station controlling loading and unloading thereof. Each apparatus includes a rack formed by a bottom wall, spaced-apart opposite side walls extending upright therefrom and a compartment above the bottom wall, between the side walls and being open at top and opposite ends. Each apparatus includes at least two carriers disposed in the compartment at different levels therein, and a product discharge control mechanism operable to selectively retain a product on and release a product from the respective carrier. One carrier is disposed above the other carrier and both extend longitudinally between open opposite ends of the compartment and laterally between opposite side walls of the rack. Each carrier is tiltable relative to the rack between a product support position and a product discharge position angularly displaced therefrom.

13 Claims, 10 Drawing Sheets

(56) References Cited

U.S. PATENT DOCUMENTS

| | | | | |
|---|---|---|---|---|
| 6,323,452 B1* | 11/2001 | Bonnet | ............... | B07C 3/082 198/370.04 |
| 8,776,694 B2* | 7/2014 | Rosenwinkel | ....... | B65G 17/345 104/88.02 |
| 2013/0084150 A1* | 4/2013 | Heitplatz | ............... | B65G 17/22 414/350 |

* cited by examiner

STACKED TILT TRAY AND CROSS-BELT SORTING SYSTEM

CROSS REFERENCE(S) TO RELATED APPLICATION(S)

This U.S. non-provisional patent application is a continuation application of co-pending U.S. non-provisional patent application Ser. No. 15/080,693, having a filing date of Mar. 25, 2016, which, in-turn, claims the benefit of (now expired) U.S. provisional patent application No. 62/138,384, having a filing date of Mar. 25, 2015, all of which are incorporated-by-reference herein in their entireties.

FIELD OF THE INVENTION

The present invention relates to product sortation systems, and, more particularly, is concerned with a multi-level product sortation apparatus and system.

BACKGROUND OF THE INVENTION

A conventional sortation system uses multiple sortation devices, each having a platform or tilt tray and being mounted to a moving belt. The sortation system identifies and selects a product that each sortation device receives at an induction station and then transports and places the selected product into a known receptacle, such as a chute, box and the like, at a discharge station. This conventional sortation system utilizes electro-mechanical devices to load the products from the induction station to the sortation devices and unload the product from the sortation devices to receptacles at the discharge station.

The sortation device of the aforementioned conventional sortation system typically is loaded with one product at one end of a linear sortation system or at a designated location along a loop-based sortation system. The product is then discharged at a designated location at the other end of the linear sortation system or at a designated location along the loop-based sortation system. The sortation device is limited to having one platform or tray capable of receiving one product and of depositing the one product into a receptacle at the discharge station.

Accordingly, there remains a need in the art for an innovation that will overcome the limitations of such conventional sortation systems and the associated problems that remain unsolved.

SUMMARY OF THE INVENTION

The present invention is directed to an innovation that overcomes the limitations of the known art and the problems that remain unsolved, by providing a multi-level product sortation apparatus and system.

In one aspect of the present invention, a multi-level product sortation apparatus includes:
a rack including
  a bottom wall having a pair of opposite side portions and a pair of opposite end portions,
  a pair of opposite side walls spaced apart from one another, each side wall having opposite bottom and top portions and a pair of opposite end portions and being attached at the bottom portion to and extending along and upright from one of the opposite side portions of the bottom wall, and
  a compartment defined above the bottom wall and between the opposite side walls, the compartment having a bottom formed by the bottom wall, a top open between the top portions of the side walls and a pair of opposite ends open between the opposite end portions of the side walls; and
at least a pair of carriers disposed in the compartment of the rack at different levels therein, one carrier being disposed above the other carrier and both carriers extending longitudinally between the open opposite ends of the compartment and laterally between the opposite side walls of the rack, each of the carriers being tiltable relative to the rack between a product support position and a product discharge position angularly displaced from the product support position.

In another aspect of the present invention, the sortation apparatus also includes a tilt mechanism supported on the rack and drivingly coupled to at least one of the carriers. The tilt mechanism is drivingly coupled to the pair of carriers.

In another aspect of the present invention, at least one of the carriers includes an endless belt assembly. The at least one carrier also includes a motive power device drivingly coupled to the endless belt assembly. At least one of the carriers includes a tray having a slide surface.

In another aspect of the present invention, each of the carriers has at least one end at which a product discharges from the carrier. The sortation apparatus also includes a product discharge control mechanism associated with each of the carriers, the product discharge control mechanism being coupled with a respective one of the carriers and having at least one blocker device disposed adjacent to and outwardly of the at least one end of the carrier. The product discharge control mechanism also has a control shaft rotatably mounted below the respective one of the carriers and mounting the at least one blocker device such that rotation of the control shaft converts the at least one blocker device between blocking and unblocking conditions relative to the at least one end of the carrier.

In another aspect of the present invention, a multi-level product sortation apparatus includes:
a rack including
  a bottom wall,
  a pair of opposite side walls spaced apart from one another and extending upright from the bottom wall so as to provide the rack with a U-shaped configuration, and
  a compartment defined above the bottom wall and between the opposite side walls and having a top and a pair of opposite ends being open between the side walls;
at least a pair of carriers disposed in the compartment of the rack at different levels therein, one carrier being disposed above the other carrier and both carriers extending longitudinally between the open opposite ends of the compartment and laterally between the opposite side walls of the rack, each of the carriers being tiltable relative to the rack between a product support position and a product discharge position angularly displaced from the product support position, each of the carriers has at least one end at which a product discharges from the carrier; and
a product discharge control mechanism associated with each of the carriers, the product discharge control mechanism being coupled with a respective one of the carriers and operable to do one of retain a product on and release a product from the respective one of the carriers.

In another aspect of the present invention, a multi-level product sortation system includes:

a plurality of sortation apparatuses, each apparatus including
 a rack including
  a bottom wall,
  a pair of opposite side walls spaced apart from one another and extending upright from the bottom wall so as to provide the rack with a U-shaped configuration, and
  a compartment defined above the bottom wall, between the side walls and being open at its top and opposite ends,
 at least a pair of carriers disposed in the compartment of the rack at different levels therein, one carrier being disposed above the other carrier and both carriers extending longitudinally between the open opposite ends of the compartment and laterally between the opposite side walls of the rack, each carrier being tiltable relative to the rack between a product support position and a product discharge position angularly displaced from the product support position, and
 a product discharge control mechanism associated with each of the carriers, the product discharge control mechanism being coupled with a respective one of the carriers and operable to do one of retain a product on and release a product from the respective one of the carriers;
a plurality of support structures each mounting and interconnecting the racks of adjacent ones of the sortation apparatuses proximate adjacent ones of the opposite side walls of the racks; and
an elongated conveyor mounting the support structures thereon so as to form the plurality of sortation apparatuses into a row thereof.

In another aspect of the present invention, each of the support structures includes: a lower main framework mounted by the elongated conveyor in the row thereof; and a pair of upper auxiliary frameworks being mounted upon and extending upwardly from the lower main framework and respectively mounting the racks of the adjacent ones of the sortation apparatuses at the adjacent ones of the opposite side walls of the racks.

In another aspect of the present invention, a control station disposed adjacent to the elongated conveyor and being configured to identify a particular product, as the product passes the control station, as to which one of the carriers the product is on in which one of the racks of which one of the sortation apparatuses and also as to its discharge location so as to cause tilting of the one carrier relative to the one rack and discharging of the particular product at the discharge location.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
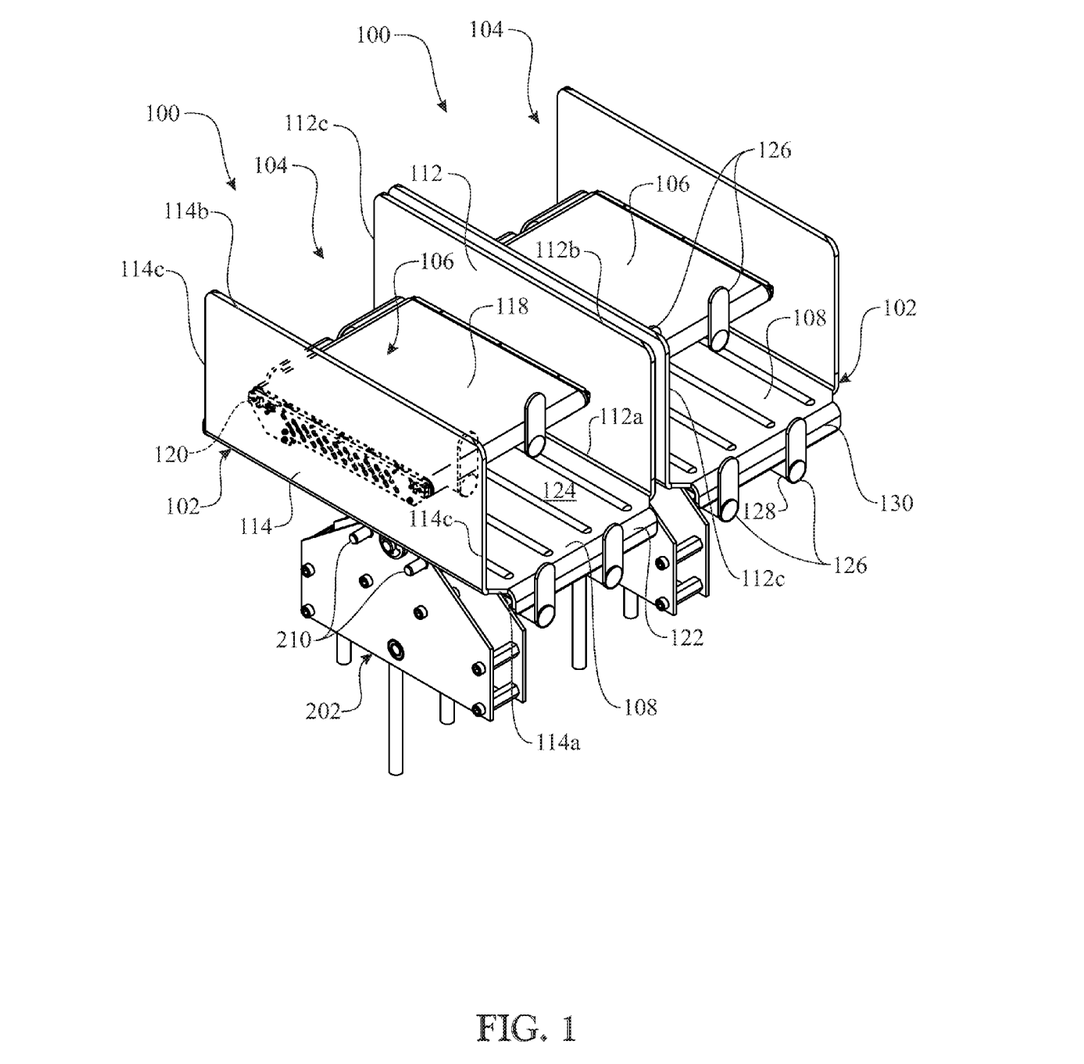
FIG. 1 presents an isometric view of an exemplary embodiment of two multi-level product sortation apparatuses in accordance with aspects of the present invention, being shown without any products loaded therein.
Figure 2:
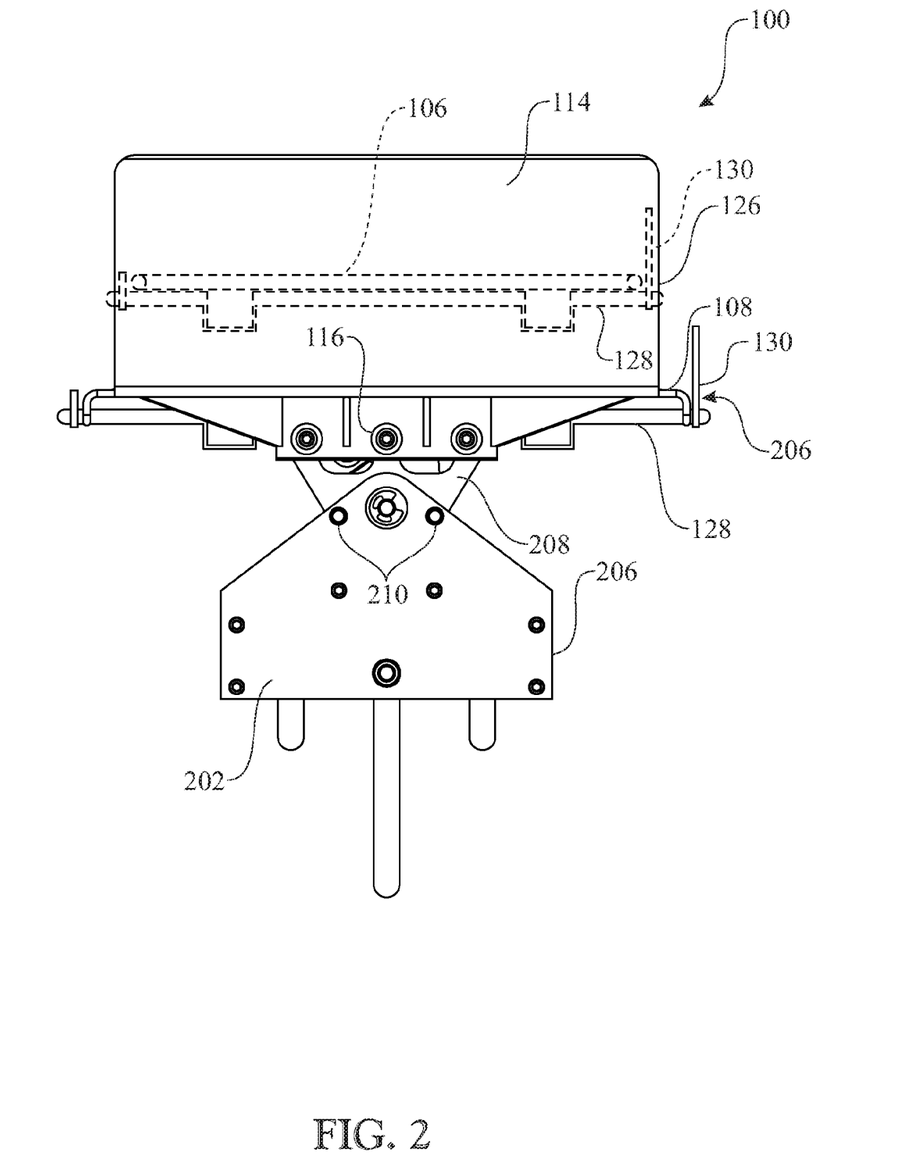
FIG. 2 presents a side elevation view of a sortation apparatus originally introduced in FIG. 1.
Figure 3:
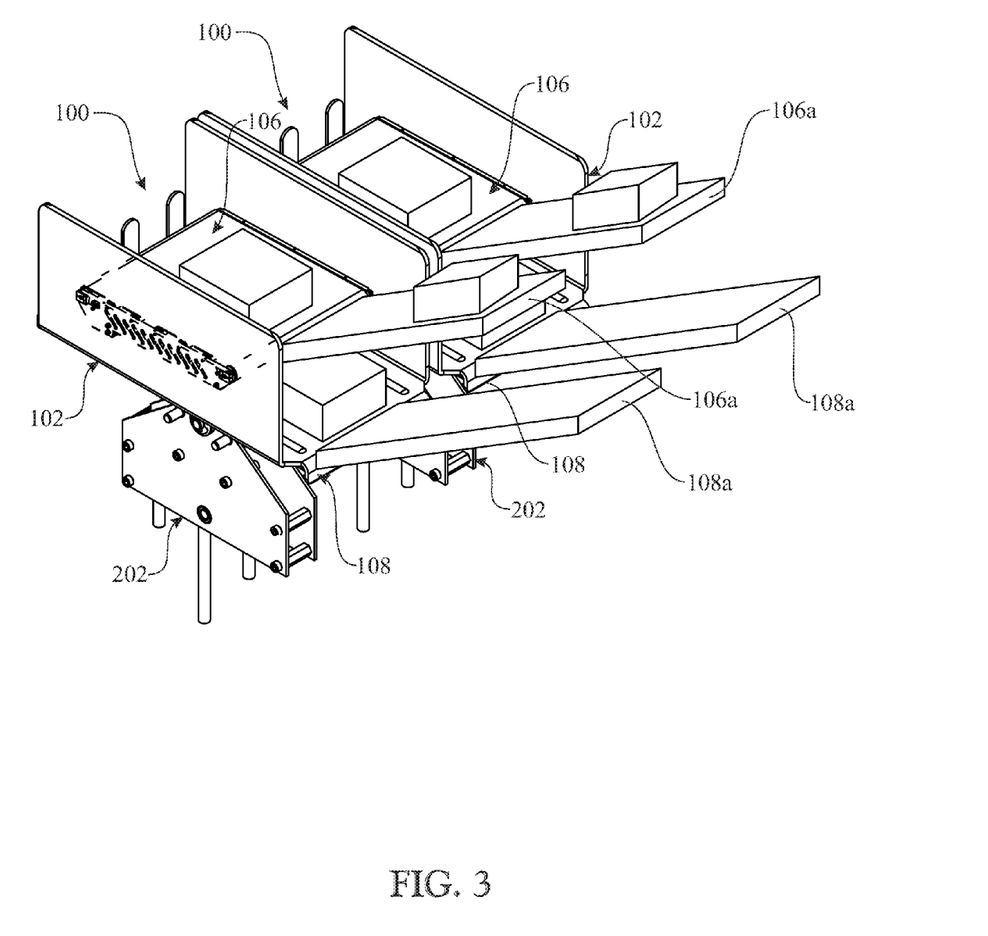
FIG. 3 presents an isometric view of the two sortation apparatuses originally introduced in FIG. 1, shown loaded with products at multiple levels thereof, and also showing side induction slides or loaders to induce products into each level while an array of cameras or similar devices is mounted vertically or horizontally for identifying each unique product (e.g., by barcode, package size, package color, etc.)

Referring now to FIGS. 1-3, there is illustrated an exemplary embodiment of two exemplary multi-level product sortation apparatuses, each generally designated 100. Each sortation apparatus 100 may include a rack 102, defining a compartment 104, and at least a pair of carriers 106, 108 supported in the compartment 104 at different spaced-apart elevations or levels, therein such that one carrier 106 is disposed above the other carrier 108. As will be apparent to those skilled in the art, more than two carriers may be provided, one above the other, correspondingly at more than two levels in a rack 102 of each multi-level product sortation apparatus 100. For illustration purposes, FIGS. 1 and 2 show the two multi-level product sortation apparatuses 100 without parcels or products thereon, whereas FIG. 3 shows the two sortation apparatuses 100 having parcels or products on each level. Also the two sortation apparatuses 100 shown in FIG. 3 incorporate lateral extensions (more commonly known to as "inductions slides" in the art) 106A, 108B, shown supporting products associated therewith and mounted to the induction section, allowing side induction of products into each level, while an array of cameras or like devices, mounted vertically or horizontally, enable identification of each unique product (e.g., via barcode package size, package color, object recognition, etc.).

As seen in FIGS. 1-3, the rack 102 of each sortation apparatus 100 includes a bottom wall 110 (see FIG. 6) and a pair of opposite side walls 112, 114 spaced apart from one another and extending upright from the bottom wall 110 so as to provide the rack with a U-shaped configuration. The bottom wall 110 has a pair of opposite side portions 110A and a pair of opposite end portions 110B. Each side wall 112, 114 has a bottom portion 112A, 114A, a top portion 112B, 114B and a pair of opposite end portions 112C, 114C and is attached at the bottom portion 112A, 114A to and extending along and upright from one of the opposite side portions 110A of the bottom wall 110.

The compartment 104 in the rack 102 of each sortation apparatus 100 is defined above the bottom wall 110 and between the opposite side walls 112, 114 of the rack. The compartment 104 has a bottom formed by the bottom wall 110 of the rack 102, a top open between the top portions 112B, 114B of the side walls 112, 114 of the rack, and a pair of opposite ends open between the opposite end portions 112C, 114C of the side walls 112, 114 of the rack.

Figure 7:
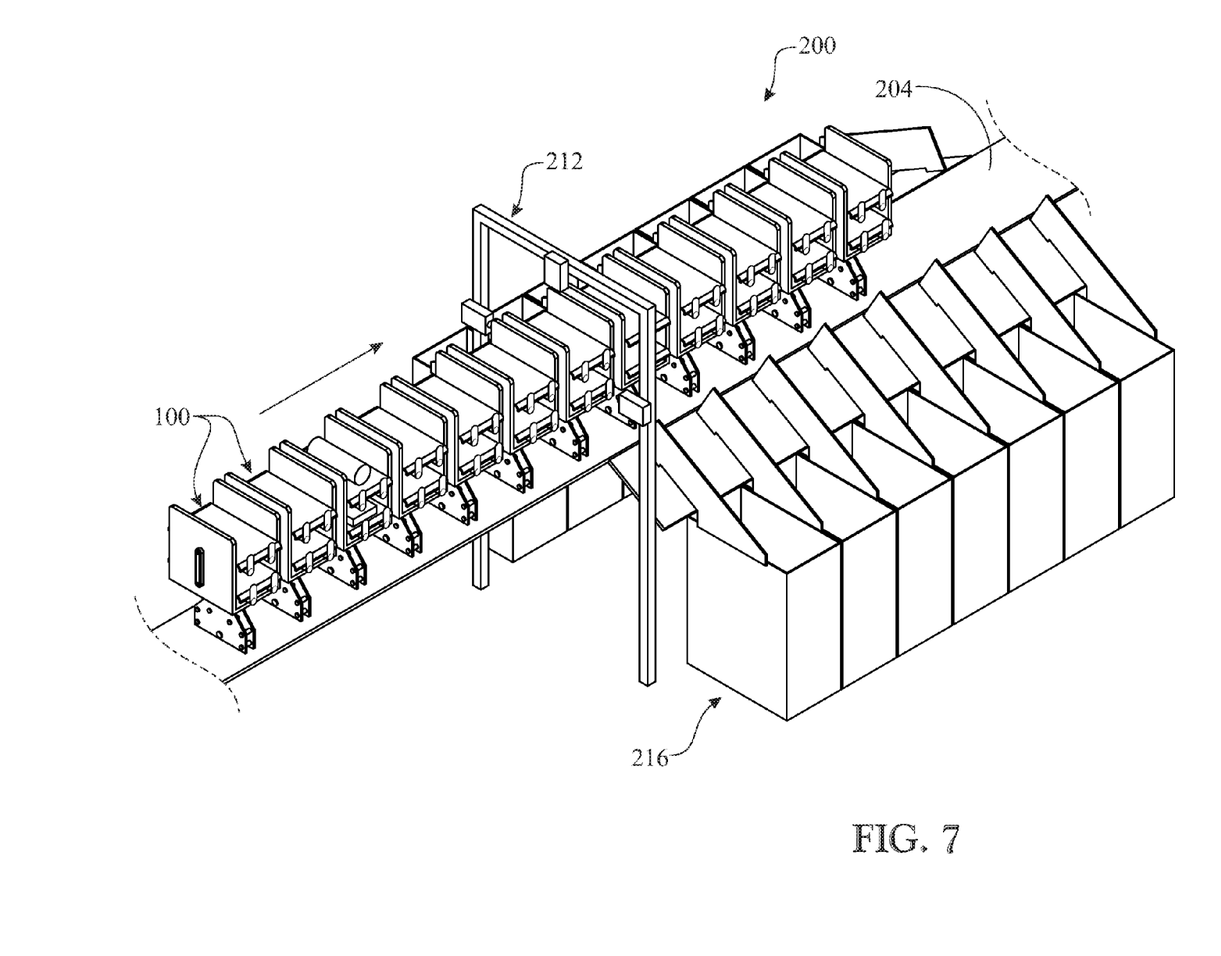
FIG. 7 presents an isometric view of the sortation system originally introduced in FIG. 6, being shown moving from the induction station toward a discharge station of the system.
Figure 8:
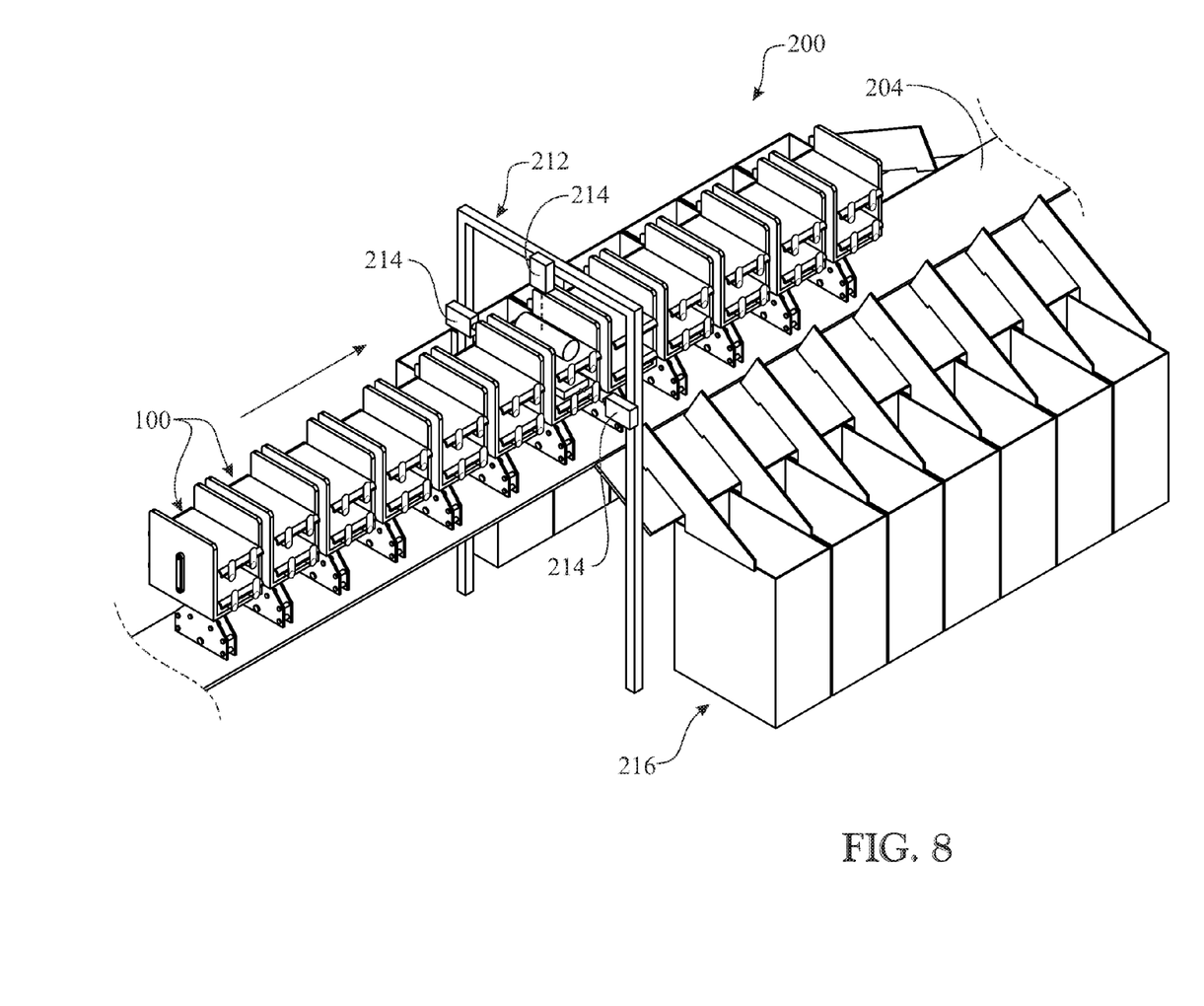
FIG. 8 presents an isometric view of the sortation system originally introduced in FIG. 6, being shown passing a control station of the system located downstream from the induction station and upstream from the discharge station of the system.
Figure 9:
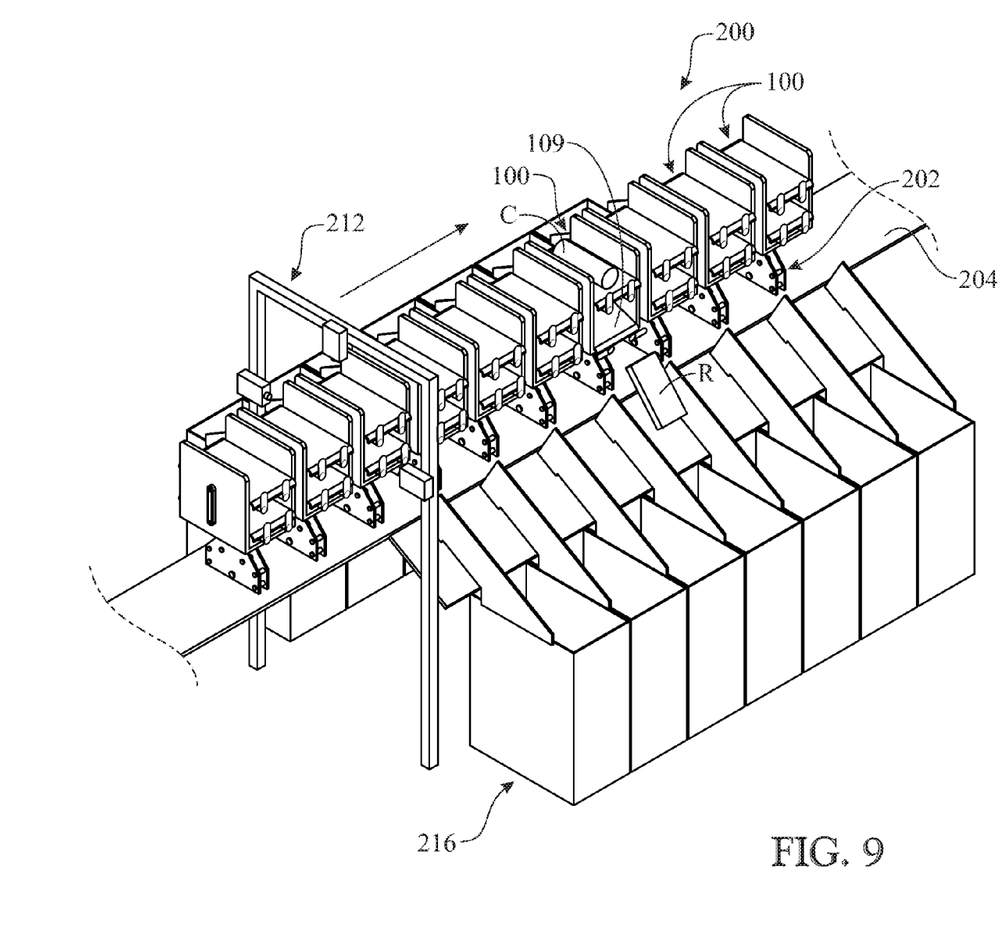
FIG. 9 presents an isometric view of the sortation system originally introduced in FIG. 6, being shown in the process of unloading one product from a lower level of the one sortation apparatus into one receptacle at the discharge station of the system.
Figure 10:
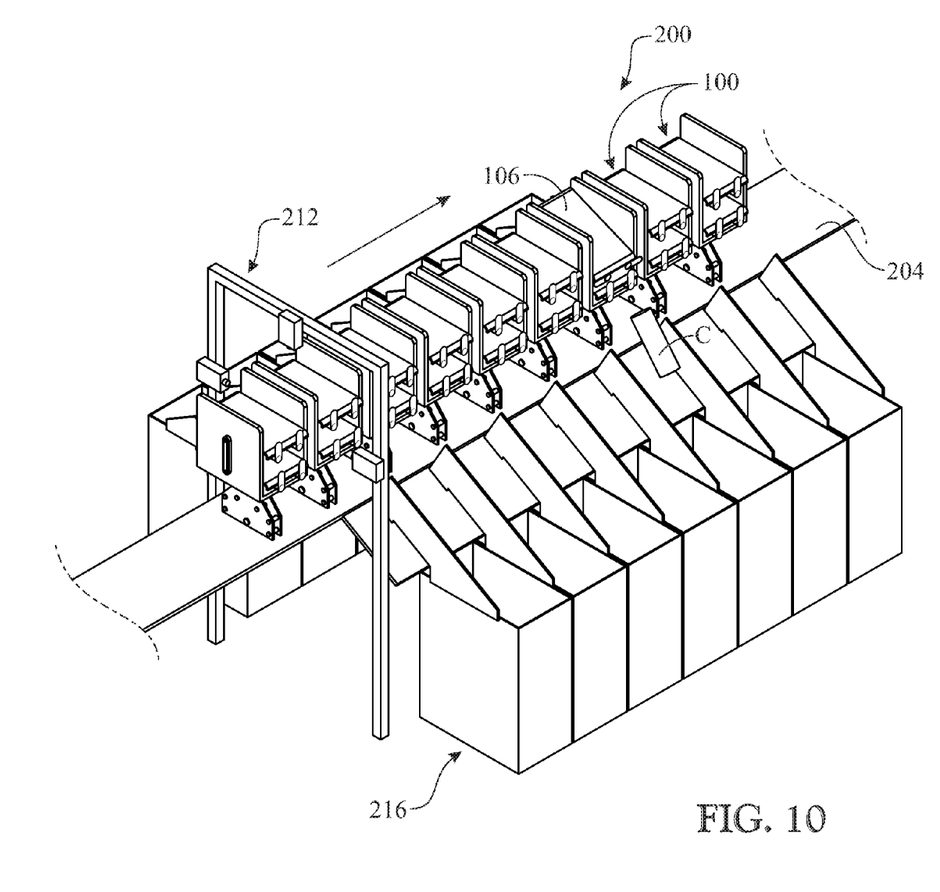
FIG. 10 presents an isometric view of the sortation system originally introduced in FIG. 6, being shown in the process of unloading another product from an upper level of the one sortation apparatus into another receptacle at the discharge station of the system.

The carriers 106, 108 of each sortation apparatus 102, being disposed in the compartment 104 of the rack 102, extend longitudinally between the opposite ends of the compartment and laterally between the opposite side walls 112, 114 of the rack. Each carrier 106, 108 is tiltable relative to the rack 102 between a product support position, as seen in FIGS. 7 and 8, and a product discharge position, as seen in FIGS. 9 and 10, angularly displaced from the product support position. Each of the carriers 106, 108 has at least one end at which a product discharges from the carrier.

Figure 4:
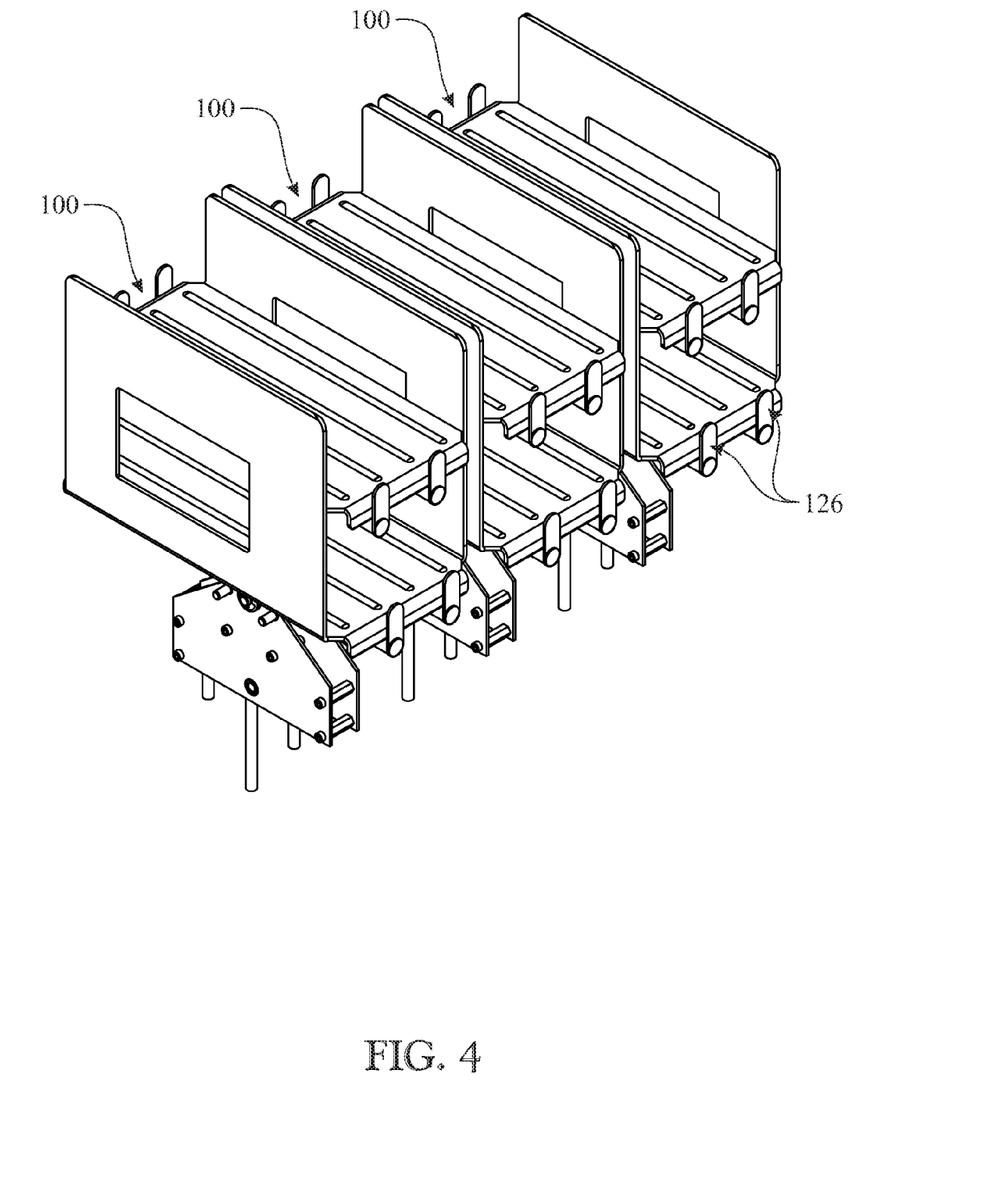
FIG. 4 presents an isometric view of an alternative exemplary embodiment of three multi-level product sortation apparatuses in accordance with aspects of the present invention, being shown without any products loaded therein.
Figure 5:
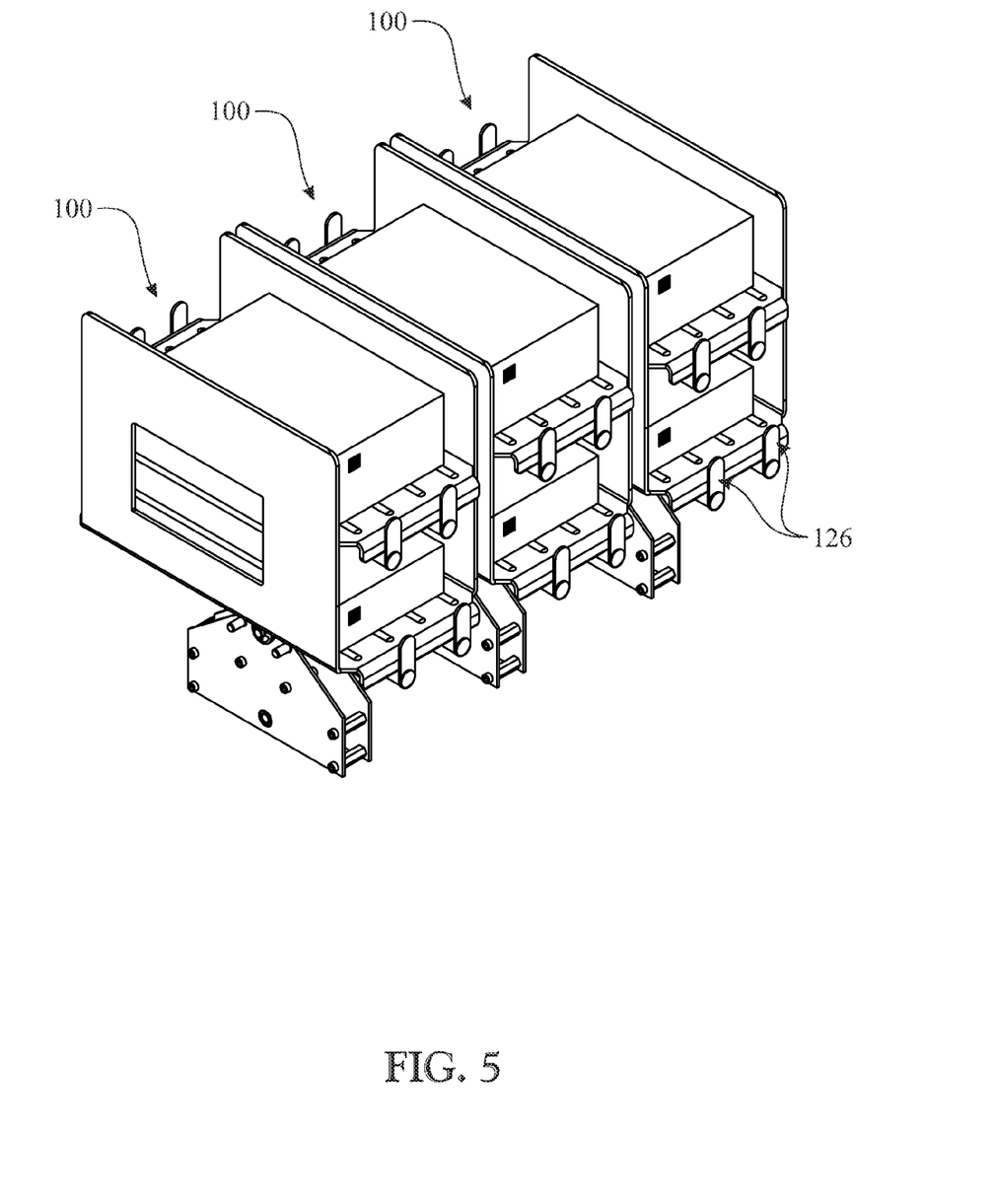
FIG. 5 presents an isometric view of the three sortation apparatuses originally introduced in FIG. 4, being shown loaded with products at multi-levels thereof.

Each sortation apparatus 100 also includes a tilt mechanism 116 supported on the rack 102 and drivingly coupled to at least one of the carriers 106, 108. The tilt mechanism 116 may be drivingly coupled to both carriers. At least one of the carriers, for example carrier 106, may include an endless belt assembly 118 and a motive power device 120, such as an electric motor, drivingly coupled to the endless belt assembly 118 for moving the same. At least one of the carriers, for example carrier 108, may include a tray 122 having a slide surface 124. Alternatively, the motorized endless belt assembly 118 may embody all of the carriers. The motorized endless belt assembly 118 creates a power-assisted transfer into a designated discharge location at faster speeds, more accurate transfers, and for products that don't slide easily (rubber objects, etc) on a slide surface tray. Still, alternatively, the slide surface tray 122 may embody all of the carriers, being seen in FIGS. 4 and 5 without and with parcels or products thereon.

Each sortation apparatus 100 also includes a product discharge control mechanism 126 associated with each of the carriers 106, 108. The product discharge control mechanism 126 is coupled with a respective one of the carriers 106, 108 and operable to do either one of retain, or hold, a product on or release a product from the respective one of the carriers when the carrier is tilted toward its designated discharge location. As shown in FIGS. 1, 2, 4 and 5, the product discharge control mechanism 126 has an elongated control shaft 128 rotatably mounted below the respective one of the carriers 106, 108, and at least one and preferably a pair of blocker devices 130 each attached to a respective one of the opposite ends of the elongated control shaft and disposed adjacent to and outwardly of the opposite ends of the respective carrier such that rotation of the elongated control shaft converts the blocker devices 130 between blocking and unblocking conditions relative to their respective ends of the carrier. The product discharge control mechanism 126 also can be in various other forms: in a first example, as a pin and diverter in the bottom wall 110 of the rack 102; in a second example, as an electro-mechanical actuator on the carrier; and, in a third example, as a pneumatic controller in the bottom wall 110 of the rack 102.

Referring now to FIGS. 6-10, there is illustrated an exemplary embodiment of a multi-level product sortation system, generally designated 200, in accordance with aspects of the present invention. The sortation system 200 includes a plurality of the sortation apparatuses 100, each as described hereinbefore. In addition, the sortation system 200 includes a plurality of support structures 202 each mounting and interconnecting the racks 102 of adjacent ones of the sortation apparatuses 100 proximate adjacent ones of the opposite side walls 112, 114 of the racks 102. The sortation system 200, in addition, includes an endless elongated conveyor assembly 204 in the form of an elongated belt that mounts the support structures 202 thereon so as to form the plurality of sortation apparatuses 100 into a row thereof. Each support structure 202 includes a lower main framework 206 mounted by the elongated conveyor 204 in the row thereof, and a pair of upper auxiliary frameworks 208 being mounted upon and extending upwardly from the lower main framework 206 and respectively mounting and interconnecting the racks 102 of adjacent ones of the sortation apparatuses 100, via tie rods 210 of the lower main framework 206, at the adjacent ones of the opposite side walls 112, 114 of the racks 102.

Figure 6:
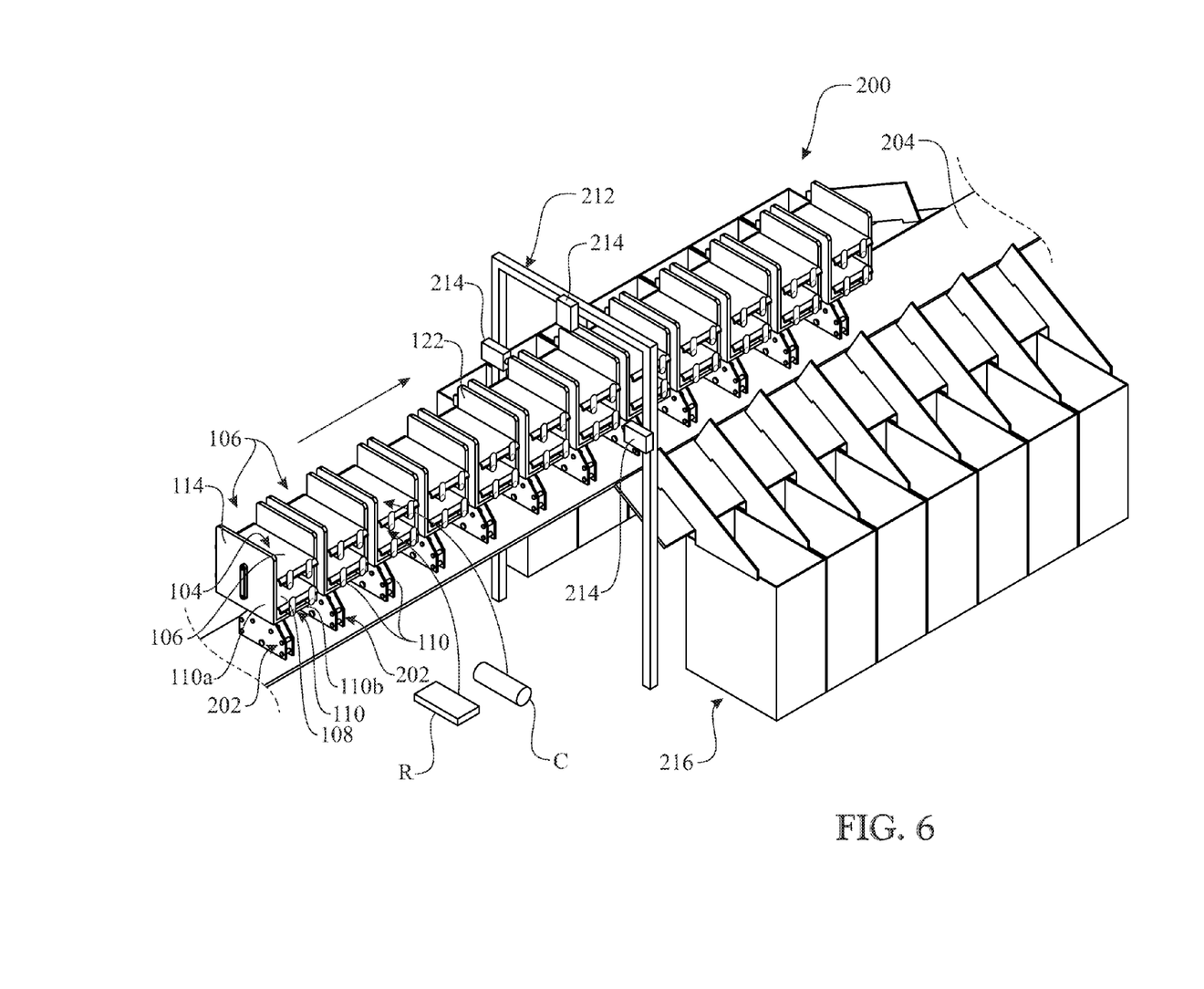
FIG. 6 presents an isometric view of an exemplary embodiment of a multi-level product sortation system in accordance with aspects of the present invention, being shown incorporating multiple sortation apparatuses and into which products are in the process of being loaded to multi-levels of one sortation apparatus of the system at an induction station.

In FIGS. 6-10 there are illustrated two exemplary cylindrical and rectangular parcels or products C and R being loaded into and unloaded from a selected one of a plurality of multi-level product sortation apparatuses 100 of the sortation system 200. FIG. 6 diagrammatically illustrates the products C, R being loaded onto the carriers 106, 108 of the one sortation apparatus 100. Representative methods that may be used to assist in loading the products C, R may be as follows: using hand-held or automated equipment, the products may be manually scanned by a barcode reader or similar unique identifier (RFID, barcode, text, printed number, color, etc) and then using mechanical, electro-mechanical or pneumatic controlled devices the products may be slid or pushed into their designated carrier and level position. It is also important to get the designated barcode on a known carrier location so the specific product can be later placed in the correct discharge location (chute or bin) for further processing.

After loading, as shown in FIG. 7 the selected one sortation apparatus 100 of the sortation system 200, being loaded with the products C, R, is carried by the conveyor belt 204 of the sortation system 200 toward a control station 212, being disposed adjacent to, and also extending over, the elongated conveyor belt 204. The conveyor belt 204 is mounted by a framework (not shown) and driven by a motor or the like (not shown).

The control station 212 is configured to identify a particular product, as the product moves past the control station, as shown in FIG. 8. An array of cameras 214 may be used at the control station 212, being mounted horizontally and vertically, for identifying each unique product (usually by barcode, but could be size, color of package, object recognition, etc) and the one carrier, rack and sortation apparatus transporting the unique product. With multiple barcode locations on sides and opposite ends of the products, the barcode readers or cameras 214 would advantageously be mounted in this configuration to accurately identify each unique product and the one carrier, rack and sortation apparatus transporting the unique product as to its discharge location.

More particularly, the control station 212 logs the unique identifier and location of the products C, R. By way of example, a barcode, 005237, might be scanned at a location, carrier, rack, and sortation apparatus, 73, level 2. The control station 212 would then place the blocker device to the "hold" position to prevent either product from transferring if its carrier was inadvertently tilted. This would be for the carrier at each level of the rack.

To unload the products, as shown in FIGS. 9 and 10, the control station 212 would then appropriately move the blocker device from the "hold" condition to the "release" condition for the product on the specific level just before the transfer location. As seen in FIG. 9, the cylindrical product C on the carrier 106 at the "top" position remains in the "hold" condition, while the rectangular product R on the carrier 108 at the "bottom" position is converted to the "release" condition and tilted relative to its rack 102 so that the rectangular product R is accurately transferred into the designated chute/box 216 at the correct discharge location. The process would be repeated, as seen in FIG. 10, to convert the carrier 106 at the "top" position to the "release" condition and tilt the carrier to accurately transfer the product R into the designated chute/box.

Momentum and gravity or driving the belt would transfer the product into the correct transfer location. This would be repeated for all products that were loaded and identified on the multi-level product sortation system 200. The control station 212 would automatically move the "hold" and "release" mechanism in the correct order to accurately transfer the different products to their designated transfer locations. Any unidentified packages would have all levels moved to the "released" positions and transfer all unidentified packages to a known location for manual sorting or to be reloaded onto the sorting machine.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A multi-level product sortation system, comprising:
a plurality of sortation apparatuses, each of the sortation apparatuses comprising
  a rack, including
    a bottom wall,
    a pair of opposite side walls spaced-apart from one another and extending upright from said bottom wall providing said rack with a U-shaped configuration, and
    a compartment defined above said bottom wall, between said side walls and open at a top and opposite ends of said compartment,
  at least a pair of carriers disposed in said compartment at different levels therein, one carrier being disposed above the other carrier and both carriers extending longitudinally between said open opposite ends of said compartment and laterally between said opposite side walls of said rack, each carrier being tiltable relative to the rack between a product support position and a product discharge position angularly displaced from the product support position, and
  a product discharge control mechanism associated with each of the carriers, the product discharge control mechanism coupled to a respective one of said carriers operable to do one of retain a product on and release a product from said respective one of said carriers and having at least one blocker device disposed adjacent to and outwardly of said at least one end of said carrier, said product discharge control mechanism also having a control shaft rotatably mounted below said respective one of said carriers, said at least one blocker device mounted to said at least one end of said respective one of said carriers such that rotation of said control shaft converts said at least one blocker device between blocking and unblocking conditions relative to said at least one end of said carrier;
a plurality of support structures each mounting and interconnecting said racks of adjacent ones of said sortation apparatuses proximate adjacent ones of said opposite side walls of said racks;
an endless conveyor assembly mounting said support structures thereon so as to form said plurality of sortation apparatuses into a row thereof; and
a control station disposed adjacent to and extending over the endless conveyor assembly, the control station includes a camera system configured to identify a product disposed upon said pair of carriers, as the product passes the control station the camera system identifies on which of the carriers of said rack of the plurality of sortation apparatuses the product is on and calculates its discharge location relative to the sortation apparatuses position and speed on the endless conveyor assembly, the camera system discharges the product by angularly tilting the one carrier relative to the rack and rotating said control shaft mounted on the respective carrier switching the blocker device from a blocking position to an unblocking position releasing said particular product at its discharge location.

2. A multi-level product sortation system as recited in claim 1, further comprising a tilt mechanism supported on said rack and drivingly coupled to at least one of said carriers.

3. A multi-level product sortation system as recited in claim 2, wherein said tilt mechanism is drivingly coupled to said pair of carriers.

4. A multi-level product sortation system as recited in claim 1, wherein at least one of said carriers includes a tray having a slidable surface.

5. A multi-level product sortation system as recited in claim 1, wherein said pair of carriers each include a corresponding tray having a slidable surface.

6. A multi-level product sortation system as recited in claim 1, wherein at least one of said carriers includes an endless belt assembly.

7. A multi-level product sortation system as recited in claim 1, wherein said pair of carriers each include a corresponding endless belt assembly.

8. A multi-level product sortation system as recited in claim 6, wherein said endless belt assembly includes an electronic motor drivingly coupled thereto.

9. A multi-level product sortation system as recited in claim 7, wherein each one of said corresponding endless belt assembly includes an electronic motor drivingly coupled thereto.

10. A multi-level product sortation system as recited in claim 1, wherein:

said bottom wall of said rack has a pair of opposite side portions and a pair of opposite end portions; and each of said side walls has opposite bottom and top portions and a pair of opposite end portions and being attached at said bottom portion to and extending along and upright from one of said opposite side portions of said bottom wall, said compartment having a top open between said top portions of said side walls and a pair of opposite ends open between said opposite end portions of said side walls.

11. A multi-level product sortation system as recited in claim 1, wherein said camera system is configured to identify a barcode on each of said product disposed upon said pair of carriers.

12. A multi-level product sortation system as recited in claim 1, wherein said camera system is configured to identify an RFID tag on each of said product disposed upon said pair of carriers.

13. A multi-level product sortation system as recited in claim 1, wherein said camera system is configured to identify any one of a shape, size and color on each of said product disposed upon said pair of carriers.

* * * * *